(12) United States Patent
Shigenaga et al.

(10) Patent No.: US 8,478,508 B2
(45) Date of Patent: Jul. 2, 2013

(54) CONTROLLER FOR INTERNAL COMBUSTION ENGINE

(75) Inventors: Masahiro Shigenaga, Nishio (JP); Kimitaka Saitoh, Nagoya (JP); Masatoshi Basaki, Nukata-gun (JP); Makoto Miwa, Kariya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 565 days.

(21) Appl. No.: 12/841,412

(22) Filed: Jul. 22, 2010

(65) Prior Publication Data

US 2011/0017172 A1   Jan. 27, 2011

(30) Foreign Application Priority Data

Jul. 27, 2009 (JP) .................. 2009-174493

(51) Int. Cl.
*G06F 19/00* (2011.01)
*G01L 23/22* (2006.01)
*F02D 41/04* (2006.01)

(52) U.S. Cl.
USPC ........... 701/103; 701/105; 701/111; 123/431; 123/435; 73/114.08

(58) Field of Classification Search
USPC ................. 123/406.26, 406.45, 406.47, 431, 123/435; 701/102–105, 110, 111, 114; 73/35.08, 114.08; 702/182, 183
See application file for complete search history.

(56) References Cited

U.S. PATENT DOCUMENTS

| 5,239,973 | A  | * | 8/1993  | Murata et al.   | 123/635    |
|-----------|----|---|---------|-----------------|------------|
| 5,611,754 | A  | * | 3/1997  | Haga et al.     | 477/181    |
| 5,866,808 | A  | * | 2/1999  | Ooyabu et al.   | 73/114.08  |
| 7,458,250 | B2 | * | 12/2008 | Bengtsson       | 73/35.08   |
| 7,856,308 | B2 | * | 12/2010 | Inada et al.    | 701/111    |
| 7,878,177 | B2 | * | 2/2011  | Czekala et al.  | 123/435    |
| 7,971,571 | B2 | * | 7/2011  | Asano et al.    | 123/406.26 |
| 8,065,070 | B2 | * | 11/2011 | Czekala et al.  | 701/103    |

FOREIGN PATENT DOCUMENTS

| JP | 05044624   | A | * | 2/1993  | 123/406.26 |
|----|------------|---|---|---------|------------|
| JP | 2007016777 | A | * | 1/2007  | 123/406.26 |
| JP | 2008-248831|   |   | 10/2008 |            |

* cited by examiner

*Primary Examiner* — Willis R Wolfe, Jr.
(74) *Attorney, Agent, or Firm* — Nixon & Vanderhye PC

(57) ABSTRACT

An ON-ignition signal is outputted from an ignition control portion in a period from a posterior time point of the power stroke to an valve opening timing of an exhaust valve so that a capacitor is charged. Then, when it is determined that the maximum value of an ion-output value detected during a negative valve overlap period becomes greater than or equal to a threshold, it is determined that the applied voltage between an center electrode and a ground electrode of a spark plug is dropped. The ON-ignition signal is outputted again to charge the capacitor before the intake valve is opened.

6 Claims, 7 Drawing Sheets

DIRECT-INJECTOR: INJECTION / STOP

ION-OUTPUT VALUE (LARGE COMBUSTION), Vnvo

ION-OUTPUT VALUE (SMALL COMBUSTION), Vnvo

CONTROLLER FOR INTERNAL COMBUSTION ENGINE

CROSS-REFERENCE TO RELATED APPLICATION

This application is based on Japanese Patent Application No. 2009-174493 filed on Jul. 27, 2009, the disclosure of which is incorporated herein by reference.

FIELD OF THE INVENTION

The present invention relates to a controller for an internal combustion engine, which is capable of accurately detecting a combustion condition based on an ion-current flowing between a center electrode and a ground electrode of a spark plug.

BACKGROUND OF THE INVENTION

An internal combustion engine which performs a homogeneous charge compression ignition (HCCI) has been researched. A fuel (gasoline) and an intake air are previously well mixed together in an intake passage, and this air-fuel mixture is compressed in a combustion chamber to be auto-ignited. In this HCCI engine, a negative valve overlap (NVO) period in which both exhaust valve and intake valve are closed is established from a posterior time point of an exhaust stroke to an anterior time point of an intake stroke, whereby a combusted gas of the air-fuel mixture remains in the combustion chamber as an internal exhaust gas recirculation (EGR). During the NVO period, the internal EGR gas is compressed, so that the temperature in the combustion chamber is increased. A fuel is directly injected into the combustion chamber of high temperature. A part of the injected fuel is burned in the combustion chamber and the temperature in the combustion chamber is further increased, whereby the previously mixed air-fuel mixture is heated so that an ignitionability of the air-fuel mixture is improved. The other unburned injected fuel is closed in the combustion chamber with the internal EGR gas of high temperature, so that the unburned injected fuel is reformed to have high ignitionability. Thus, the ignitionability of the previously mixed air-fuel mixture is further improved. The auto-ignition combustion can be realized.

It should be noted that a precise control of an auto-ignition timing is required to perform the auto-ignition combustion efficiently. Thus, it is desirable to perform the auto-ignition combustion based on an actually detected auto-ignition timing. JP-2008-248831A shows an ion-current detecting method for a spark ignition (SI) engine. In this method, an auto-ignition combustion control is performed in a specified driving condition, and an ion-current flowing between a center electrode and a ground electrode of a spark plug is detected in order to indirectly detect the auto-ignition timing. It should be noted that an ion-current detector for an SI engine is well known. That is, a part of electric power supplied to a spark plug is accumulated in a capacitor, and this electric power is applied between a center electrode and a ground electrode of a spark plug. When the fuel is combusted to generate ion, the ion-current flowing between both electrodes is detected.

In order to detect the auto-ignition timing based on the ion-current, it is necessary to supply electric power to a spark plug so that the capacitor is charged prior to a detection of the auto-ignition timing. However, if electric power is supplied to the spark plug while the fuel exists in the combustion chamber, it is likely that the fuel is ignited by a discharged spark. In such a case, an engine torque may fluctuate or an exhaust characteristic may deteriorate due to a deviation of the auto-ignition timing.

In the method shown in JP-2008-248831A, during a NVO period, the spark plug receives electric power before the fuel is injected in order to avoid a deviation of the auto-ignition timing, whereby a fluctuation in torque and a deterioration in exhaust characteristic can be avoided.

However, according to the above method, although the capacitor can be charged without a deviation in auto-ignition timing, a detection accuracy of the ion-current may be possibly deteriorated. That is, after charging the capacitor, when the ion-current flows due to a fuel combustion during the NVO period, the voltage applied between both electrodes of the spark plug is decreased due to a voltage reduction of the capacitor, which may cause a deterioration in detecting accuracy of the ion-current. The detecting accuracy of a combustion condition in the combustion chamber may be also deteriorated.

SUMMARY OF THE INVENTION

The present invention is made in view of the above matters, and it is an object of the present invention to provide a controller for an internal combustion engine which is capable of avoiding a deterioration in a detection accuracy of an ion-current.

According to a first aspect of the present invention, a controller includes: a first fuel supplying means for supplying a fuel into a combustion chamber of the internal combustion engine in an NVO period during which an exhaust valve and an intake valve are closed, and a second fuel supplying means for supplying a fuel into the combustion chamber in the intake stroke after a fuel supply by the first fuel supplying means. The NVO period is established from a posterior time point of an exhaust stroke until an anterior time point of an intake stroke of the internal combustion engine.

The controller further includes: an ion-current obtaining means for obtaining an information about an ion-current which flows between a center electrode and a ground electrode of a spark plug in a period during which an electric voltage is applied between the center electrode and the ground electrode by a capacitor which stores a part of electric power supplied to the spark plug; a detector detecting a combustion condition of the supplied fuel based on the information about the ion-current obtained by the ion-current obtaining means; a first electric power supply means for supplying an electric power to the spark plug in order to charge the electric storage in a period from a posterior time point of the power stroke until the fuel is supplied by the first fuel supplying means; and a second electric power supply means for supplying an electric power to the spark plug again in order to charge the electric storage before the fuel is supplied by the second fuel supplying means when the electric power charged by the electric storage becomes lower than a specified value during the NVO period.

In performing an auto-ignition combustion, it is required that a specified voltage is applied between both electrodes of a spark plug in order to detect an ion-current flowing between both electrodes of the spark plug during a main combustion period for generating an engine torque from a posterior time point of the compression stroke to a power stroke. After the first electric power supply means supplies an electric power to the spark plug so that the electric storage is charged, when an ion-current flows between both electrodes due to a combustion of a fuel supplied by the first fuel supplying means, a charged quantity of the electric storage is reduced, whereby the applied voltage between the both electrodes of the spark plug may be dropped.

In this case, it is likely that the detection accuracy of the ion-current during the main combustion period may deteriorate and the detection accuracy of a combustion condition in the combustion chamber may be also deteriorates. In terms of this point, according to the present invention, when the electric power stored in the electric storage during the NVO period becomes lower than a specified value, it can be determined that the applied voltage between both electrodes of the spark plug is dropped. And then, before the second fuel supplying means supplies the fuel, an electric power is supplied to the spark plug to charge the electric storage. Thereby, while it can be avoided that the auto-ignition is conducted at inappropriate auto-ignition timing, the applied voltage to the spark plug during the main combustion period can be maintained high. A deterioration in the detection accuracy of the ion-current during the main combustion period can be suitably avoided.

According to a second aspect of the present invention, in the first aspect of the present invention, the second electric power supply means supplies the electric power to the spark plug again when an ion-current computed from an output value of the ion-current obtaining means is greater than or equal to a specified value during the NVO period.

When the ion-current flowing between both electrodes of the spark plug is relatively large, the electric power stored in the electric storage is largely reduced, so that the applied voltage between both electrodes is dropped. According to the second aspect, when the ion-current exceeds a specified value during the NVO period, the applied voltage drop can be accurately detected with simple configuration.

According to a third aspect of the present invention, the controller further includes a control means for performing an auto-ignition combustion control of the internal combustion engine based on the ion-current computed from an output value of the ion-current obtaining means during the NVO period.

The present inventors found that it is possible to detect a combustion condition in a combustion chamber during the NVO period based on the ion-current. This combustion condition, such as a reform degree of the fuel and temperature in the combustion camber, affects a main combustion condition. According to the third aspect of the present invention, the auto-ignition combustion control is performed based on the ion-current during the NVO period, whereby a control accuracy of the auto-ignition combustion is further improved.

According to a fourth aspect of the invention, the controller further includes a retard means for retarding a fuel supply timing of the second fuel supplying means when a time period from when the electric power stored in the electric storage becomes lower than a specified value during the NVO period until when the second fuel supplying means supplies the fuel becomes less than a specified time period.

Under a conditions where the time period from when the electric power stored in the electric storage becomes lower than the specified value during the NVO period until when the second fuel supplying means supplies the fuel becomes shorter, if the second electric supply means supplies the electric power to the spark plug again, a discharge spark may be generated after the second fuel supplying means supplies the fuel. In this case, it is likely that the air-fuel mixture is ignited at inappropriate timing to deteriorate the combustion condition. In terms of this point, according to the present aspect of the invention, the fuel supply timing of the second fuel supplying means is retarded, whereby a time period required for supplying the electric power to the spark plug again can be ensured. Thus, it can be avoided that the air-fuel mixture is ignited at inappropriate timing.

According to fifth aspect of the invention, the controller further includes a charging means for charging the electric storage without through the spark plug when a time period from when the electric power stored in the electric storage becomes lower than a specified value during the NVO period until when the second fuel supplying means supplies the fuel becomes less than a specified time period.

Under a conditions where the time period from when the electric power stored in the electric storage becomes lower than the specified value during the NVO period until when the second fuel supplying means supplies the fuel becomes shorter, the electric storage can be charged without generating a discharge spark between both electrodes of the spark plug and a specified voltage can be applied between both electrodes of the spark plug. Thus, it can be avoided that the air-fuel mixture is ignited at inappropriate timing.

According to sixth aspect of the invention, in any one of the above aspects, the first fuel supplying means includes a direct-fuel-injector which injects the fuel directly into the combustion chamber, and the second fuel supplying means includes a port-fuel-injector of which fuel injection rate is larger than that of the direct-fuel-injector.

It is required to inject the fuel into the combustion chamber at an appropriate timing during the NVO period in order to effectively conduct an auto-ignition combustion. Its fuel injection quantity is usually smaller than a fuel quantity required for generating engine torque. According to the present aspect, the fuel can be injected directly into the combustion chamber at an appropriate timing. Furthermore, since two fuel injectors are provided, the fuel injection required for the NVO period and the fuel injection required for generating the engine torque can be appropriately conducted.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

First Embodiment

A first embodiment of a controller applied to a gasoline engine will be described hereinafter.

Figure 1:
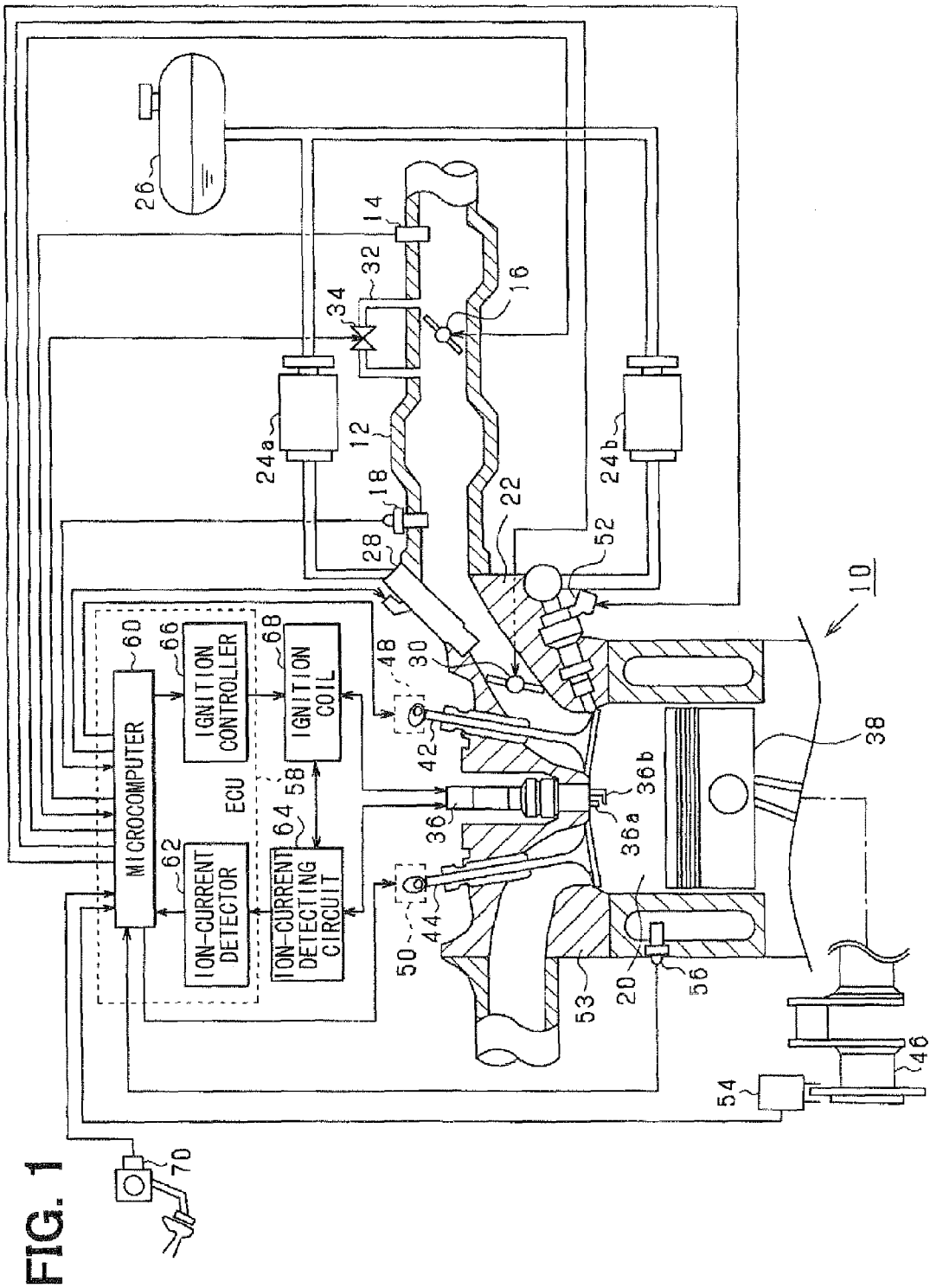
FIG. 1 is a schematic view showing an entire structure of a fuel injection system according to a first embodiment.

FIG. 1 shows an entire structure of a fuel injection system.

An engine 10 is a four stroke spark ignition engine. An intake passage 12 of the engine 10 is provided with an airflow meter 14 detecting intake air flow rate, a throttle valve 16 driven by an electric actuator, and an intake pressure sensor 18 detecting intake air pressure. An intake manifold 22 is connected to the intake passage 12 downstream of the intake pressure sensor 18. The intake manifold 22 introduces intake air into each cylinder of the engine 10. A port-fuel-injector 28 is provided to the intake manifold 22 at a vicinity of an intake port of each cylinder. The port-fuel-injector 28 is electromagnetically driven to inject the fuel which is pumped up from a fuel tank 26 by a fuel pump 24a. The port-fuel-injector 28 is used for the fuel injection for generating a torque of the engine 10 (for power control). An air flow control valve 30 is disposed in the intake manifold 22 downstream of the port-fuel-injector 28 in order to generate swirl flow or tumble flow in a combustion chamber 20. A bypass passage 32 is connected to the intake passage 12 in such a manner as to bypass the throttle valve 16. An idle speed control valve 34 is provided in the bypass passage 32.

A spark plug 36 is mounted on a cylinder head of the engine 10. The spark plug 36 includes a center electrode 36a and a ground electrode 36b, which are positioned in the combustion chamber 20.

Each cylinder of the engine 10 has two intake ports and two exhaust ports which are respectively opened or closed by intake valves 42 and exhaust valves 44. When the intake valves 42 are opened, air-fuel mixture of the intake air and the fuel injected by the port-fuel-injector 28 is introduced into the combustion chamber 20. This air-fuel mixture is ignited by the spark plug 36. An energy generated by the fuel combustion is converted into a rotational energy of a crank shaft 46 through a piston 38. The combusted fuel is discharged into an exhaust manifold 53 when the exhaust valves 44 are opened.

The valve timings of the intake valves 42 and the exhaust valves 44 are variably adjusted by an intake valve timing controller 48 and an exhaust valve timing controller 50. The intake valve timing controller 48 and the exhaust valve timing controller 50 have well known configurations.

The engine 10 is further provided with a direct-fuel-injector 52 which injects the fuel directly into the combustion chamber 20. The direct-fuel-injector 52 is electromagnetically driven to inject the fuel which is pumped up from a fuel tank 26 by a fuel pump 24b. The direct-fuel-injector 52 can perform a small-quantity injection for an auto-ignition combustion control, which will be described later. An injection rate of the direct-fuel-injector 52 is smaller than that of the port-fuel-injector 28. The injection rate represents a fuel injection quantity per unit time.

Moreover, the engine 10 is provided with a crank angle sensor 54 detecting a rotation angle of a crankshaft 46, a coolant temperature sensor 56 detecting a coolant temperature, and the like.

An electronic control unit (ECU) 58 controls various actuators for performing various controls of the engine 10. The ECU 58 is comprised of a microcomputer 60 having a CPU, a RAM and a ROM, an ion-current detecting portion 62 and an ignition controlling portion 66. The ion-current detecting portion 62 receives an ion-output value from an ion-current detecting circuit 64, which will be described later, and outputs the ion-output value to the microcomputer 60. The ignition controlling portion 66 outputs an ignition signal to an ignition coil 68 so that the spark plug 36 generates electric discharge sparks. The ECU 58 receives detection signals from an accelerator sensor 70, a crank angle sensor 54 and the air flow meter 14. The ECU 58 performs a fuel injection control, a variable valve timing control, an ignition control, an air flow control, and a fuel combustion control.

Figure 2:
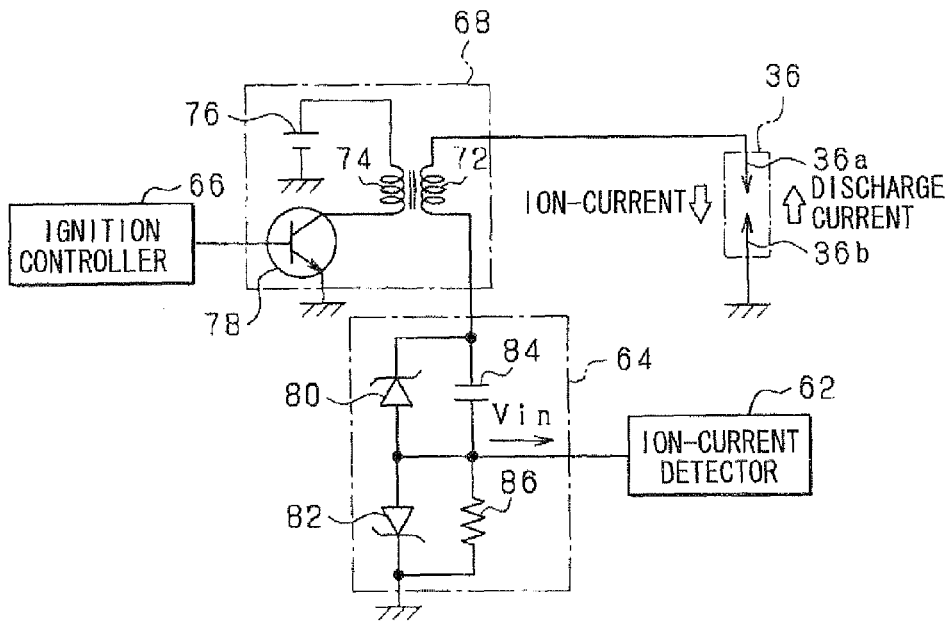
FIG. 2 is a circuit diagram showing an ion-current detecting circuit according to the first embodiment.

Referring to FIG. 2, a configuration for detecting the ion-current will be described in detail.

As shown in FIG. 2, one end of a secondary coil 72 of an ignition coil 68 is connected to the spark plug 36. The other end of the secondary coil 72 is grounded through the ion-current detecting circuit 64. Moreover, one end of a primary coil 74 of the ignition coil 68 is connected to a battery 76 of 12 volts. The other end of the primary coil 74 is connected to a collector of a power transistor 78.

The ion-current detecting circuit 64 is comprised of a first and second Zener diodes 80, 82, a capacitor 84, a resistor (ion-current detecting resistor) 86. Specifically, anodes of each Zener diode 80, 82 are connected in series. A cathode of the first Zener diode 80 is connected to the other end of the secondary coil 72. The capacitor 84 is connected to the first Zener diode 80 in parallel, and the ion-current detecting resistor 86 is connected to the second Zener diode 82 in parallel.

When an ON-ignition signal is transmitted to a base of the power transistor 78 from the ignition controlling portion 66 so that the power transistor 78 is turned on, a primary current supplied from the battery 76 flows through the primary coil 74. When the power transistor 78 is turned off receiving an OFF-ignition signal from the ignition controlling portion 66 after energizing the primary coil 74, a high voltage is induced in the secondary coil 72. An electric discharge spark is generated between the center electrode 36a and the ground electrode 36b, and a discharge-current flows from the ground electrode 36b toward the center electrode 36a. The capacitor 84 is charged by the discharge current flowing through the secondary coil 72 until its voltage reaches the Zener voltage. That is, a part of electric power which will be supplied to the spark plug 36 from the secondary coil 72 is charged to the capacitor 84. Thereby, high voltage is applied between the center electrode 36a and the ground electrode 36b from the capacitor 84.

When the air-fuel mixture is ignited and combusted in the combustion chamber 20, the ion is generated in the combustion chamber 20. An energizing path is formed between the both electrodes 36a, 36b, and the ion-current flows from the center electrode 36a to the ground electrode 36b. Since the ion-current flows in a direction from the resistor 86 to the capacitor 84, an input voltage Vin (ion-output value) to the ion-current detecting portion 62 varies according to the ion-current. The ion-current detecting portion 62 is connected between the capacitor 84 and the resistor 86.

According to the present embodiment, the combustion of the engine 10 can be switched between the spark ignition (SI) combustion and the homogeneous charge compression ignition (HCCI) combustion. The ECU 58 performs an SI combustion control or an HCCI combustion control according to an engine driving condition. Hereafter, the HCCI combustion control will be described.

In this control, a negative valve overlap (NVO) period in which both exhaust valve 44 and intake valve 42 are closed is established from a posterior time point of an exhaust stroke to an anterior time point of an intake stroke. The combusted gas of the air-fuel mixture remains in the combustion chamber 20 as an internal exhaust gas recirculation (internal EGR). During the NVO period, the internal EGR gas is compressed, so that the temperature in the combustion chamber 20 is increased. The fuel is directly injected into the combustion chamber 20 from the direct-fuel-injector 52. A part of the injected fuel is burned in the combustion chamber 20 and the temperature in the combustion chamber 20 is further increased, whereby the previously mixed air-fuel mixture in the intake manifold 22 is heated. The other unburned injected fuel is closed in the combustion chamber 20 with the internal EGR gas of high temperature, so that the unburned injected fuel is reformed to have high ignitionability.

Meanwhile, besides the fuel injection by the direct-fuel-injector 52, the fuel is injected into the intake manifold 22 by the port-fuel-injector 28 during a period from the exhaust stroke to the intake stroke for controlling an output of the engine 10. The air-fuel mixture is generated in the intake manifold 22. This air-fuel mixture is introduced into the combustion chamber 20 when the intake valves 42 are opened. Then, the pressure and the temperature in the combustion chamber 20 are increased in a compression stroke, and the reformed unburned fuel is auto-ignited at a vicinity of a compression top dead center. This auto-ignition of the reformed unburned fuel causes a main combustion of the air-fuel mixture. It should be noted that the air-fuel mixture can be made lean by the auto-ignition combustion and the combustion condition can be improved. Thus, the fuel consumption rate can be improved and NOx can be reduced. Besides, the fuel injection quantity for controlling the output of the engine 10 is larger than the fuel injection quantity which is required during the NVO period.

Generally, it is relatively difficult to precisely control an ignition timing in the auto-ignition combustion. A knocking or a misfire easily occurs. According to the present embodiment, the auto-ignition combustion control is performed based on an ion-output value obtained by the ion-current detecting portion 62. Specifically, the auto-ignition timing is estimated based on a timing at which the ion-output value detected during the main combustion period becomes a maximum value. It is estimated whether a misfire occurs based on an intensity of the maximum value of the ion-output value. Then, based on the above estimation results, the fuel injection quantity injected by the direct-fuel-injector 52 during the NVO period is corrected. More specifically, if the estimated auto-ignition timing is advanced relative to an appropriate auto-ignition timing which is defined for every engine driving condition, the fuel injection quantity is reduced. Thereby, a heat energy generation during the NVO period is restricted to restrict the heating of the air-fuel mixture in the intake manifold 22 during the intake stroke, so that the auto-ignition timing can be retarded to avoid a knocking. Moreover, if it is estimated that a misfire occurs, the fuel injection quantity is increased. Thereby, the heat energy generation during the NVO period is increased to expedite the auto-ignition.

In order to detect the ion-current due to the auto-ignition combustion, the ON-ignition signal is outputted from the ignition control portion 66 in a period from a posterior time point of the power stroke to an valve opening timing of the exhaust valve 44 (first coil-energization period) so that the capacitor 84 is charged. This process is referred to as a first coil-energization process. The first coil-energization period is established in order to avoid a situation where the auto-ignition timing deviates from an appropriate auto-ignition timing which is defined for every engine driving condition. That is, under a condition where the air-fuel mixture exists in the combustion chamber 20, the ON-ignition signal is outputted so that the spark plug 36 generates a spark to ignite the air-fuel mixture. In this case, it is likely that the engine torque may fluctuate and/or the exhaust characteristic may deteriorate due to the combustion of the air-fuel mixture. However, by performing the first coil-energization process during the first coil-energization period at which no air-fuel mixture exists, a deviation in the auto-ignition timing due to a charging of the capacitor 84 can be avoided.

After performing the first coil-energization process, when the ion-current flows due to a combustion of the fuel injected by the direct-fuel-injector 52, the voltage of the capacitor 84 drops and the applied voltage between the electrodes 36a, 36b of the spark plug 36 also drops. In this case, it is likely that the detection accuracy of the ion-current deteriorates and the detection accuracy of a combustion condition in the combustion chamber 20 is also deteriorates.

Figure 3A:
FIGS. 3A to 3C are time charts showing a relationship between a direct fuel injection and generated ion-currents according to the first embodiment.
Figure 3B:
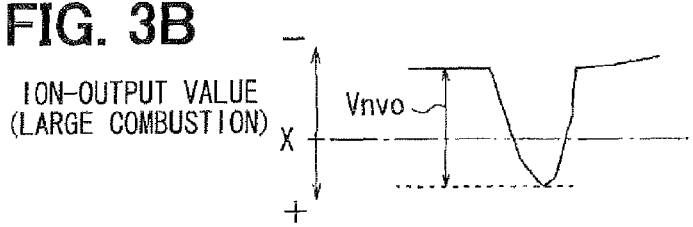
Figure 3C:
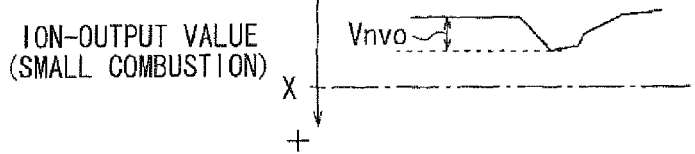

According to the present embodiment, as shown in FIGS. 3A to 3C, it is determined whether the applied voltage between both electrodes 36a, 36b of the spark plug 36 is decreased based on a maximum value Vnvo of the ion-output value detected during the NVO period. Specifically, as shown in FIG. 3B, when the maximum value Vnvo of the ion-output value is greater than or equal to a specified threshold "X" after the direct-fuel-injector 52 injects the fuel, it is determined that the applied voltage between both electrodes 36a, 36b has largely dropped. That is, when the ion-output value Vin (ion-current value) is large, the stored electricity of the capacitor 84 is decreased and a voltage at the capacitor 84 is also decreased. Meanwhile, as shown in FIG. 3C, when the maximum value Vnvo of the ion-output value is less than the threshold "X", it is determined that the applied voltage between both electrodes 36a, 36b has not largely dropped. When it is determined that the applied voltage has largely dropped, the ON-ignition signal is outputted from the ignition controlling portion 66 again to energize the spark plug 36 and to charge the capacitor 84. This process is referred to as a second coil-energization process. Thereby, it can be avoided that the auto-ignition timing deviates from the appropriate auto-ignition timing. The applied voltage which is required to detect the ion-current during the main combustion period is ensured, so that the deterioration in detecting accuracy of the ion-current can be avoided.

Figure 4:
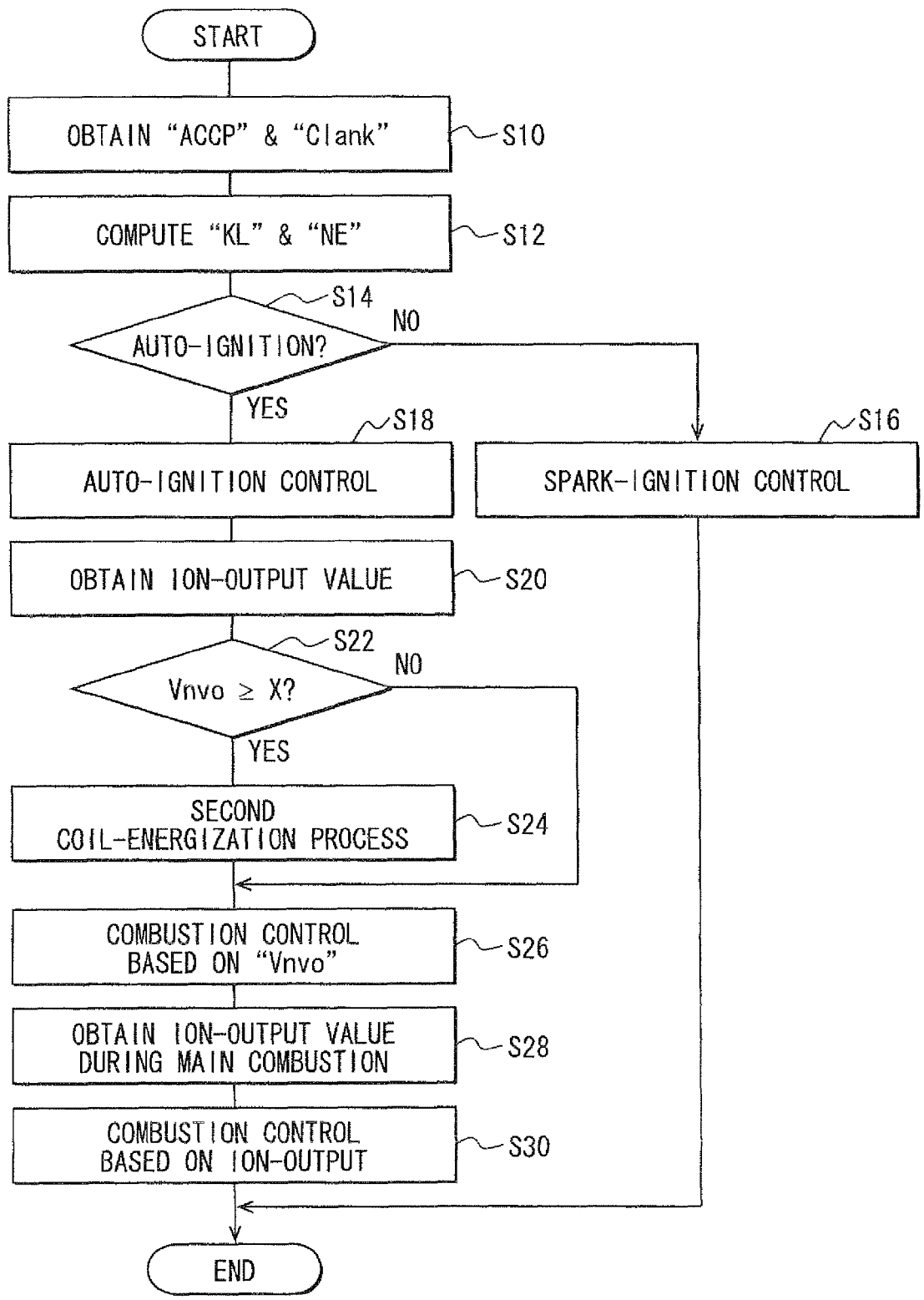
FIG. 4 is a flow chart showing a coil-energization process according to the first embodiment.

FIG. 4 is a flowchart showing a combustion control processing including the second coil-energization process. This processing is repeatedly executed at a specified period by the ECU 58.

In step S10, the computer obtains an output value "ACCP" of the accelerator position sensor 70 and an output value "Clank" of the crank angle sensor 54.

In step S12, the computer computes an engine load (required torque, load ratio) "KL" based on the output value "ACCP" and computes an engine speed "NE" based on the output value "Clank".

In step S14, the computer determines whether the engine 10 is in an auto-ignition combustion region. In this process, the computer determines whether the present driving region is for a spark ignition combustion control or an auto-ignition combustion control. Specifically, the computer determines whether it is in the auto-ignition combustion region based on the engine load "KL" and the engine speed "NE" by means of a map which is previously experimentally computed. This map defines the auto-ignition combustion region and the spark ignition combustion region in relationship to the engine load "KL" and the engine speed "NE". It should be noted that the auto-ignition combustion region corresponds to regions except a high-load, high-speed region and a low-load, low-speed region. Other than the auto-ignition combustion region is defined as the spark ignition combustion region. This is for avoiding a vibration of the engine 10 and an increase in noise which originate in auto-ignition combustion in the high-load, high-speed region, and/or for avoiding a situation where the auto-ignition combustion is difficult to be conducted due to a low temperature of the engine 10 in the low-load, low-speed region.

When the answer is NO in step S14, the procedure proceeds to step S16 in which the spark ignition combustion control is executed. Specifically, a fuel injection control, an ignition control and a valve timing control are executed based on the engine load "KL", the engine speed "NE", a coolant temperature detected by the coolant temperature sensor 56 by means of a map. This map defines a fuel injection quantity and fuel injection timing of the port-fuel-injector 28, the ignition timing of the spark plug 36, the valve timings of the intake valves 42 and the exhaust valves 44 in relationship to the engine load "KL" and the engine speed "NE".

When the answer is YES in step S14, the procedure proceeds to step S18 in which the auto-ignition combustion control is executed. Specifically, a process for establishing the NVO period, the fuel injection control process, and the first coil-energization process are executed based on the engine load "KL" and the engine speed "NE" by means of a map. This map defines the NVO period, the fuel injection quantity and timing of the direct-fuel-injector 52, the fuel injection quantity and timing of the port-fuel-injector 28, and the first coil-energization process timing in relationship to the engine load "KL" and the engine speed "NE". Besides, according to the present embodiment, when it is determined that the engine load "KL" is less than a specified value, the spark ignition by the spark plug 36 is conducted. This spark ignition is referred to as an ignition assist process. When the engine load "KL" is low, the heat energy generated by a fuel combustion during the NVO period is decreased. During the intake stroke, the air-fuel mixture may not be heated sufficiently, which may cause a misfire. The ignition assist process is for avoiding such a misfire.

Incidentally, if the fuel injection timing of the direct-fuel-injector 52 is retarded, a dispersion in the auto-ignition timing between combustion cycles becomes large, which may deteriorate the combustion condition and increase a torque variation. Meanwhile, if the fuel injection timing of the direct-fuel-injector 52 is advanced, the reform of the fuel is excessively expedited to advance the auto-ignition timing, which may cause a knocking. Thus, the fuel injection timing of the direct-fuel-injector 52 during the NVO period is established according to a requirement for restricting a torque variation and a knocking.

Then, the procedure proceeds to step S20 in which the ion-output value outputted from the ion-current detecting circuit 64 is obtained.

In step S22, the computer determines whether the maximum value Vnvo of the ion-output value during the NVO period is greater than or equal to the threshold "X". This processing is for determining whether the applied voltage between both electrodes 36a, 36b is sufficient to ensure an detection accuracy of the ion-current. The threshold "X" can be established based on the voltage of the capacitor 84 which is required to ensure the detection accuracy of the combustion condition.

When the answer is YES in step S22, the procedure proceeds to step S24 in which the second coil-energization process is executed. This processing is for charging the capacitor 84 to ensure the detection accuracy of the ion-current during the main combustion period. It should be noted that the second coil-energization process is executed in a period from a time when the maximum value Vnvo is detected until a time when the NVO period is terminated (the intake valve 42 is closed). This period is referred to as a second coil-energization period. This is for avoiding a situation where the auto-ignition timing deviates from an appropriate auto-ignition timing which is defined for every engine driving condition. That is, when the NVO period is terminated to open the intake valve 42, the air-fuel mixture is introduced into the combustion chamber 20. If the second coil-energization process is executed after the air-fuel mixture is introduced into the combustion chamber 20, it is likely that the spark plug 36 generates the spark at inappropriate timing and the air-fuel mixture is ignited, which may cause a torque fluctuation and a deterioration in the exhaust characteristic. However, by performing the second coil-energization process during the second coil-energization period at which no air-fuel mixture exists, a deviation in the auto-ignition timing due to a charging of the capacitor 84 can be avoided. Although the fuel injected by the direct-fuel-injector 52 exists in the combustion chamber 20 during the second coil-energization period, the intake air scarcely exists in the combustion chamber 20. Thus, even if the injected fuel is ignited, its combustion reaction is relatively small and a decrease in voltage of the capacitor 84 is small. Thus, the detection accuracy of the ion-current scarcely deteriorates during the main combustion period.

When the process in step S24 is completed, or when the answer is NO in step S22, the procedure proceeds to step S26 in which a combustion control process is executed based on the maximum value Vnvo of the ion-output value. This process is for improving the control accuracy of the auto-ignition combustion in consideration of a fact that the combustion condition of the main combustion depends on a reform degree of the fuel and an increasing rate of temperature in the combustion chamber 20. That is, when the maximum value Vnvo of the ion-output value is large, the reform of the fuel and the temperature rising in the combustion chamber 20 are accelerated. Thus, the auto-ignition timing of the main combustion is advanced and a knocking easily occurs.

Meanwhile, when the maximum value Vnvo is small, the heat energy for heating the air-fuel mixture becomes small, which may cause a misfire. Thus, by obtaining the combustion condition during the NVO period based on the maximum value Vnvo, the combustion condition during the main combustion can be estimated. A control for the main combustion is adjusted based on the combustion condition during the NVO period, whereby the control accuracy of the auto-ignition control can be improved. Specifically, when the maximum value Vnvo is relatively large, the fuel injection quantity by the port-fuel-injector 28, which is computed in step S18, is corrected so as to be decreased. Alternatively, the air flow in the combustion chamber 20 is adjusted in order to restrict the main combustion and to avoid a knocking. As an adjusting method of the air flow in the combustion chamber 20, the opening timing of the intake valves 42 is adjusted, one of the intake valves 42 is opened, or the air flow control valve 30 is operated.

Meanwhile, when the maximum value Vnvo is relatively small, the fuel injection quantity by the port-fuel-injector 28, which is computed in step S18, is corrected to be increased.

In step S28, the ion-output value during the main combustion period is obtained.

In step S30, a combustion control process based on the ion-output value obtained in step S28 is executed. This process is for obtaining a combustion condition during the current main combustion period, and for reflecting the obtained combustion condition on the succeeding auto-ignition combustion control. Specifically, when the auto-ignition timing which is estimated based on the ion-output value during the main combustion period is advanced relative to the appropriate auto-ignition timing, the fuel injection quantities of the direct-fuel-injector 52 and the port-fuel-injector 28, which will be defined in step S18, are corrected so as to be decreased. Thereby, an occurrence of knock can be restricted. Moreover, when it is determined that a misfire occurs based on the ion-output value, the fuel injection quantity of the direct-fuel-injector 52 is corrected to be increased. Thereby, a generating quantity of heat energy by the fuel combustion during the NVO period is increased to avoid a misfire.

When the processes in steps S16 and S30 are completed, this processing is terminated.

Figure 5:
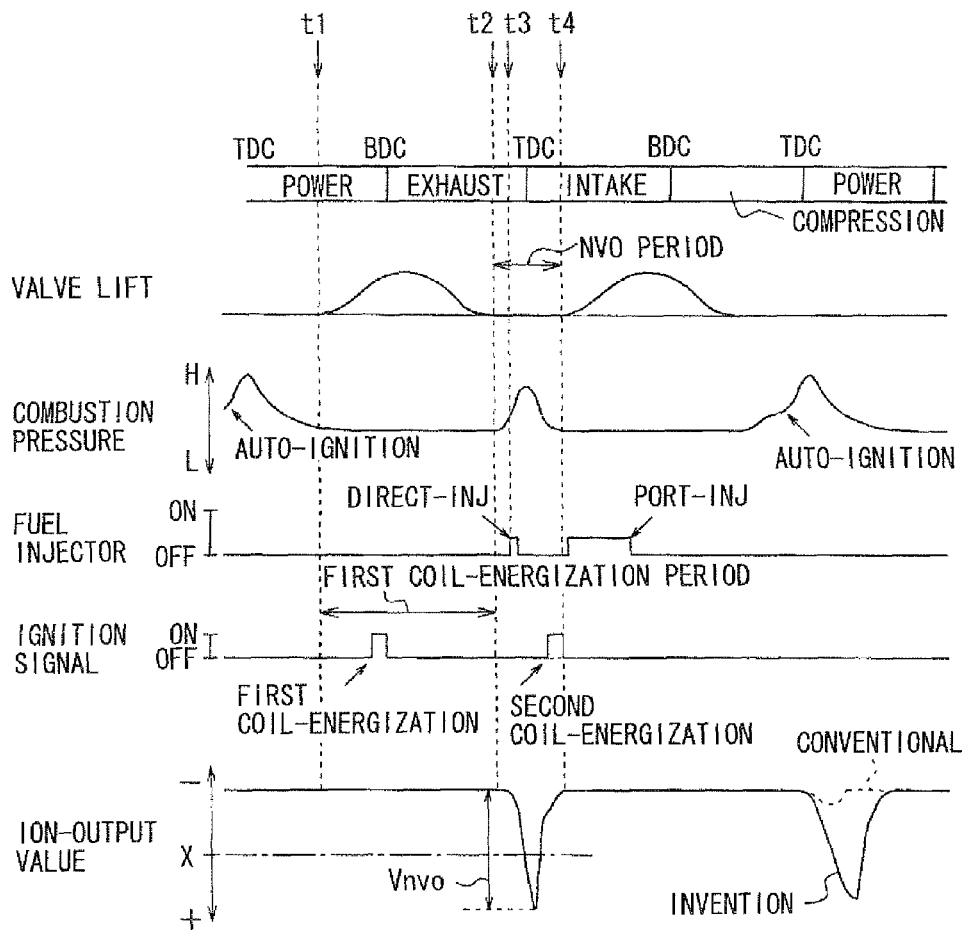
FIG. 5 is a time chart showing coil-energization processes according to the first embodiment.

FIG. 5 is a time chart showing a second coil-energization process according to the present embodiment. Specifically, FIG. 5 shows a variation in valve lift amount of the intake valves 42 and the exhaust valves 44, a variation in combustion pressure in the combustion chamber 20, a fuel injection timing of the direct-fuel-injector and the port-fuel-injector, an ON-OFF condition of the ignition signal outputted from the ignition controlling portion 66, and a variation in ion-output value.

As shown in FIG. 5, the first coil-energization process is executed in a period from a time "t1" to a time "t2". At the time "t1", the engine is in a posterior time point of the power stroke. At the time "t2", the exhaust valve 44 is closed. Then, at a time "t3" in the NVO period (from a time t2 to a time t4), the direct-fuel-injector 52 injects the fuel into the combustion chamber 20. When the maximum value Vnvo of the ion-output value becomes greater than or equal to the threshold "X", the second-coil-energization process is executed by the time "t4" at which the intake valves 42 are opened. Thereby, since the capacitor 84 is charged enough before the main combustion, the ion-current can be accurately detected during the main combustion period.

In the conventional art, even though the voltage of the capacitor 84 drops due to a combustion during the NVO period, the second coil-energization process in not executed. Thus, the applied voltage between both electrodes 36a, 36b runs shortage, which deteriorates the detection accuracy of the ion-current during the main combustion period.

According to the present embodiment, when it is determined that the maximum value Vnvo of the ion-output value becomes greater than or equal to the threshold "X", the second coil-energization process is executed until the intake valves 42 are opened. Thus, a deterioration in the detection accuracy of the ion-current during the main combustion period can be suitably avoided.

According to the present embodiment described above, following advantages can be obtained.

(1) When it is determined that the maximum value Vnvo of the ion-output value detected during the NVO period becomes greater than or equal to the threshold "X", the second coil-energization process is executed until the intake valves 42 are opened. Thereby, it can be avoided that the auto-ignition timing deviates from the appropriate ignition timing and that the detection accuracy of the ion-current deteriorates. The auto-ignition combustion control can be improved.

(2) The auto-ignition combustion control is executed based on the ion-output value detected during the main combustion period and the maximum value Vnvo of the ion-output value detected during the NVO period. Thus, the accuracy of the auto-ignition combustion control can be further improved.

(3) During the NVO period, the direct-fuel-injector 52 injects the fuel directly into the combustion chamber 20 and the port-fuel-injector 28 injects the fuel for controlling the output of the engine. Thereby, the fuel injection required for the auto-ignition combustion can be appropriately executed.

Second Embodiment

A second embodiment will be described hereinafter, focusing on a difference from the first embodiment.

When a time period "T" from when the maximum value Vnvo becomes greater than or equal to the threshold "X" until when the intake valves 42 are opened is less than a specified timing period "T1", a retard control is executed to retard the fuel injection timing of the port-fuel-injector 28. This retard control is executed in order to avoid a situation where the auto-ignition timing deviates from an appropriate auto-ignition timing which is defined for every engine driving condition. Under a situation where the time period "T" becomes shorter, if the second coil-energization process is executed, the spark plug 36 generates a spark after the intake valves 42 are opened to introduce the air-fuel mixture into the combustion chamber 20. In this case, it is likely that the air-fuel mixture is ignited at inappropriate timing to deteriorate the combustion condition.

Figure 6:
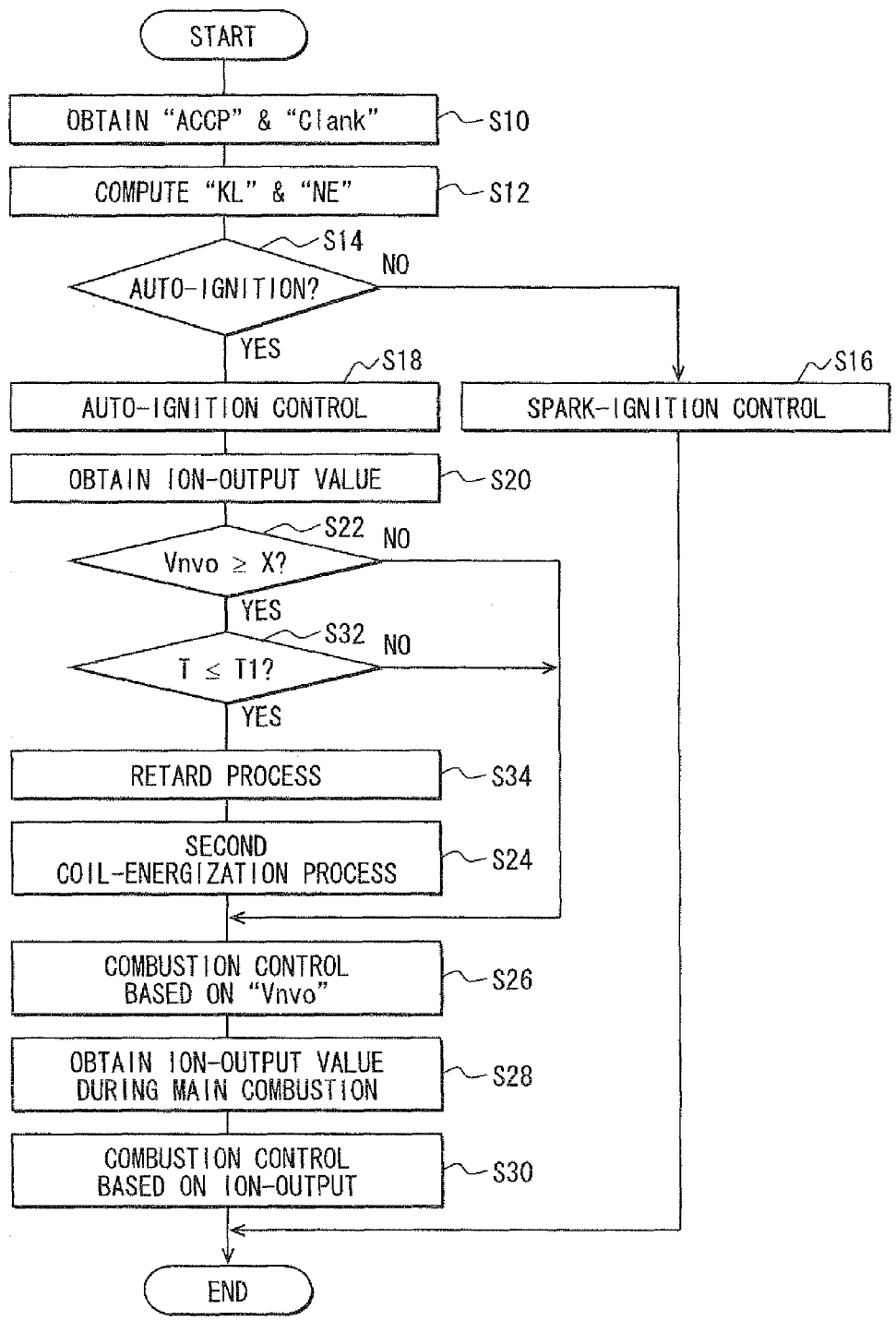
FIG. 6 is a flow chart showing a coil-energization process according to a second embodiment.

FIG. 6 is a flowchart showing a combustion control processing including the second coil-energization process. This processing is repeatedly executed at a specified period by the ECU 58. In FIG. 6, the same processes as those in FIG. 4 are indicated with the same reference numerals.

In step S22, the computer determines whether the maximum value Vnvo of the ion-output value during the NVO period is greater than or equal to the threshold "X". When the answer is YES in step S22, the procedure proceeds to a step S32 in which it is determined whether the time period "T" is less than or equal to the specified time period "T1". This process is for determining whether the second coil-energization process can be executed. The above time period "T1" may be established according to a time period which is required for executing the second coil-energization process.

When the answer is YES in step S32, the computer determines that the second coil-energization process can not be executed during the NVO period. Then, the procedure proceeds to step S34 in which the fuel injection timing of the port-fuel-injector 28 is retarded. This process is for ensuring a time period required for executing the second coil-energization process. Besides, the fuel injection timing of the port-fuel-injector 28 may be retarded as long as the air-fuel mixture is generated during the intake stroke.

When the processing in step S34 is completed, the procedure proceeds to step S24. When the processing in step S24 is completed, or when the answer is NO in step S30 or S32, the procedure proceeds to steps S26 to S30.

When the processing in step S16 or S30 is completed, this processing is terminated.

As described above, when the computer determines that the time period "T" is less than or equal to the specified time period "T1", the fuel injection timing of the port-fuel-injector 28 is retarded. Thereby, it can be avoided that the auto-ignition timing deviates from the appropriate ignition timing and that the detection accuracy of the ion-current deteriorates.

Third Embodiment

A third embodiment will be described hereinafter, focusing on a difference from the second embodiment.

Figure 7:
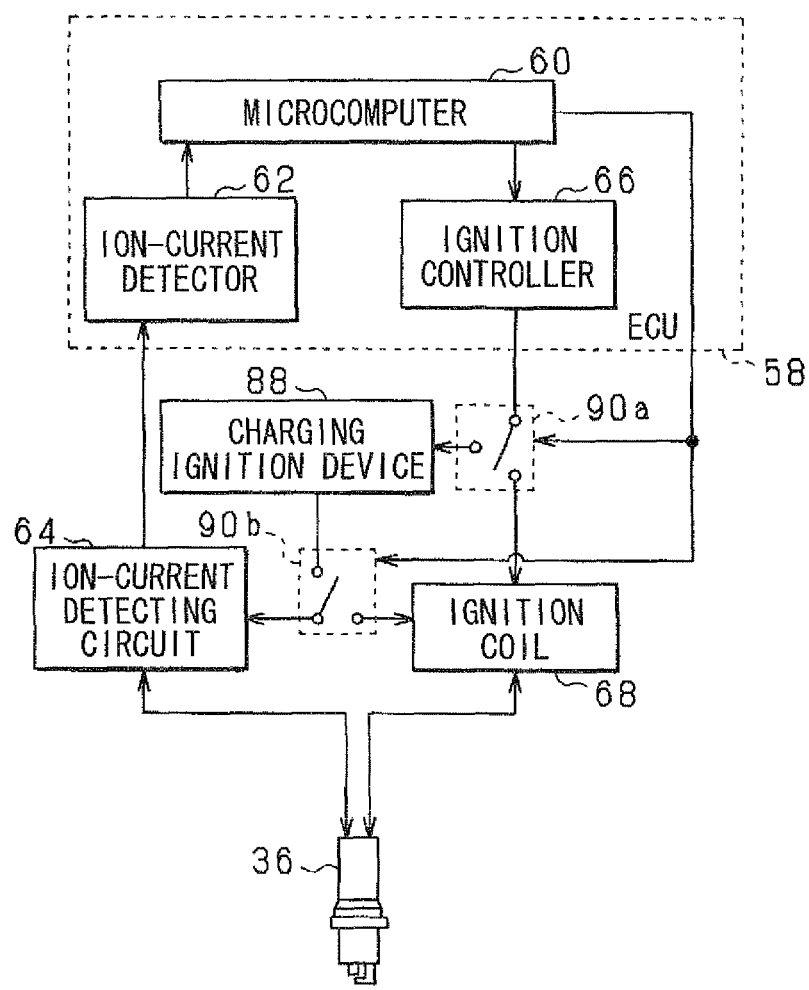
FIG. 7 is a schematic view showing an essential part of a fuel injection system according to a third embodiment.

FIG. 7 shows an essential structure of a control system in the third embodiment. In FIG. 7, the same parts as those in FIG. 1 are indicated with the same reference numerals, and only the parts for detecting the ion-current are illustrated.

As shown in FIG. 7, the third embodiment is provided with a charging ignition device 88 and switching circuits 90a, 90b. When the time period "T" is less than or equal to the specified time period "T1", the switching circuits 90a, 90b are switched so that the capacitor 84 is charged by the charging ignition device 88 instead of the ignition coil 68 in order to execute the second coil-energization process. This second coil-energization process is executed in order to avoid a situation where the auto-ignition timing deviates from an appropriate auto-ignition timing which is defined for every engine driving condition. When it is determined that the above time period "T" exceeds a time period necessary for executing the second coil-energization process, the capacitor 84 is charged by the charging ignition device 88 so that no spark is generated in the combustion chamber 20. Thus, it can be avoided that the auto-ignition timing deviates from an appropriate auto-ignition timing which is defined for every engine driving condition.

It should be noted that the charging ignition device 88 has the same configuration as the ignition coil 68 and the ignition plug 36 shown in FIG. 2. In such a configuration, the switching circuit 90a is switched so that the charging ignition device 88 is electrically connected to the ignition control portion 66, and the switching circuit 90b is switched so that the ion-current detecting circuit 64 is electrically connected to the charging ignition device 88, whereby the capacitor 84 is charged by the charging ignition device 88 without generating a spark discharge in the combustion chamber 20.

Figure 8:
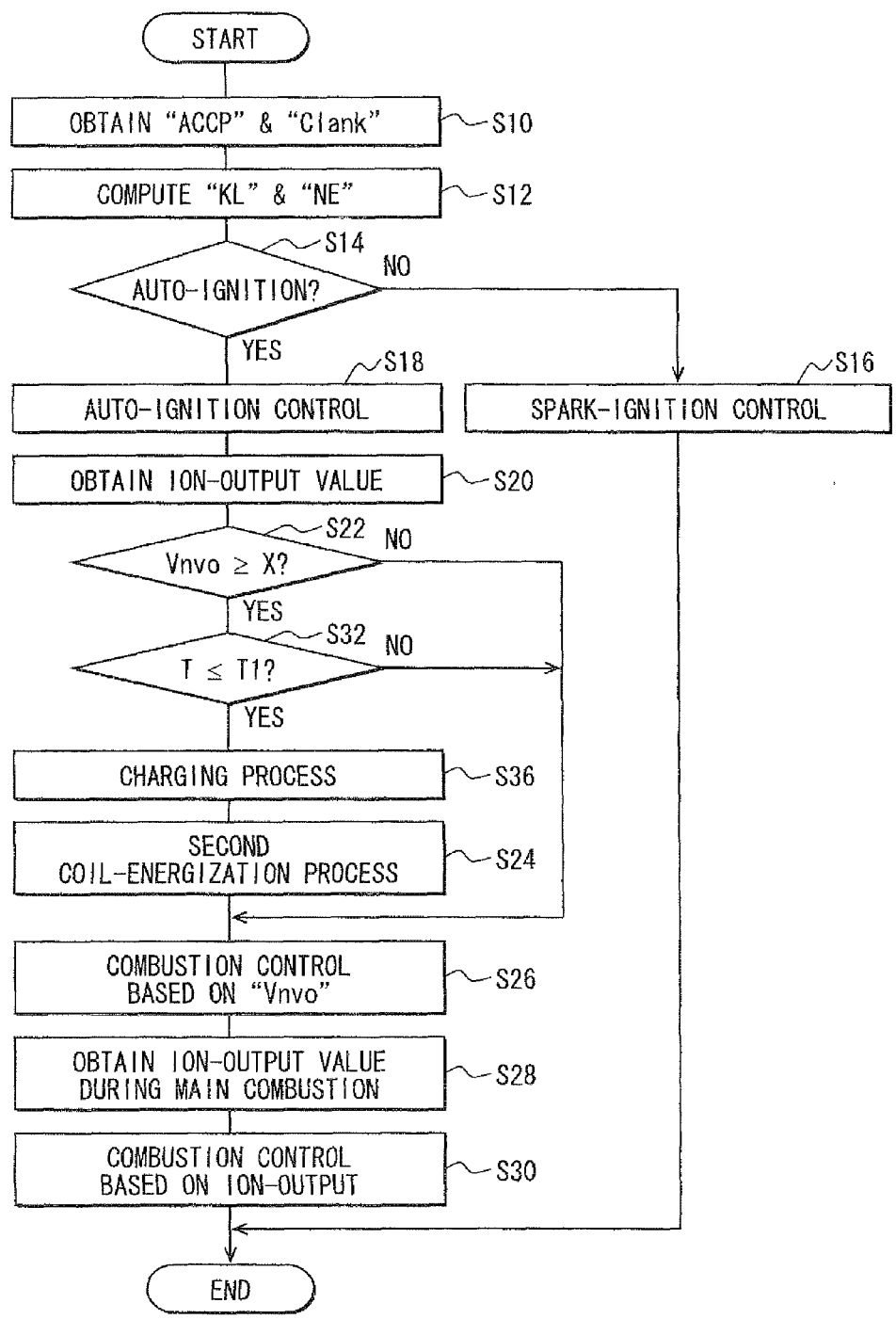
FIG. 8 is a flow chart showing a coil-energization process according to the third embodiment.

FIG. 8 is a flowchart showing a combustion control processing including the second coil-energization process. This processing is repeatedly executed at a specified period by the ECU 58. In FIG. 8, the same processes as those in FIG. 6 are indicated with the same reference numerals.

When the computer determines that the maximum value Vnvo of the ion-output is greater than or equal to the threshold "X" in step S22, the procedure proceeds to step S32. When the answer is YES in step S32, the procedure proceeds to step S36 in which the capacitor 84 is charged by the charging ignition device 88. It should be noted that the charging process of the capacitor is executed before a timing at which the air-fuel mixture is supposed to be auto-ignited.

When the processing in step S36 is completed, the procedure proceeds to step S24. When the processing in step S24 is completed, or when the answer is NO in step S22 or S32, the procedure proceeds to steps S26 to S30.

When the processing in step S16 or S30 is completed, this processing is terminated.

As described above, when the computer determines that the time period "T" is less than or equal to the specified time period "T1", the charging ignition device 88 charges the capacitor 84. Thereby, it can be avoided that the auto-ignition timing deviates from the appropriate ignition timing and that the detection accuracy of the ion-current deteriorates.

Other Embodiments

The above-mentioned embodiments may be Modified as follows:

In the first embodiment, the second coil-energization period is limited within the NVO period in order to avoid that the air-fuel mixture is spark-ignited. However, actually, it may occur that the fuel injection timing of the port-fuel-injector 28 is established after the intake valves 42 are opened. In this case, the second coil-energization period is not limited within the NVO period. For example, as long as the fuel injection quantity of the direct-fuel-injector 52 is lower than a specified quantity "α", the second coil-energization period may be established within a period from when it is determined that the maximum value Vnvo of the ion-output value is greater than or equal to the threshold "X" until when the port-fuel-injector 28 injects the fuel. In a case that the fuel injection quantity of the direct-fuel-injector 52 during the NVO period is relatively small, even if the intake air is introduced into the combustion chamber after the intake valves 42 are opened, it is less likely that an air-fuel mixture of the intake air and the fuel injected by the direct-fuel-injector 52 is spark-ignited by the spark plug 36. The specified quantity "α" may be experimentally established as a minimum value of the fuel at which the air-fuel mixture can not spark-ignited.

Although the engine 10 is provided with the dire-fuel-injector 52 (first fuel injector) and the port-fuel-injector 28 (second fuel injector) in the above embodiments, the engine 10 may be provided with only the direct-fuel-injector 52 which injects the fuel required during the NVO period and the fuel for controlling the engine output. In a case that the fuel injection required during the NVO period is lower than the specified quantity "α" and the fuel for controlling the engine output is injected during the intake stroke after the intake valves 42 are opened, the second coil-energization process may be executed before the fuel for controlling the engine output is injected. Alternatively, the engine 10 is provided with two dire-fuel-injectors 52. One of the two injectors 52 injects the fuel required during the NVO period, and the other injects the fuel for controlling the engine output.

In the above embodiments, the computer determines whether the second coil-energization process should be executed based on the maximum value Vnvo of the ion-output value during the NVO period. Alternatively, the computer may determines whether the second coil-energization process should be executed based on a voltage "V" between both ends of the capacitor 84, which is detected by a voltage sensor (not shown). Specifically, when it is determined that the voltage "V" becomes less than a specified voltage "V0", the computer determines the applied voltage between both electrodes 36a, 36b is dropped to start the second coil-energization process. The specified voltage "V0" can be established based on the voltage of the capacitor 84 which is required to ensure the detection accuracy of the combustion condition.

In the above embodiments, the engine load "KL" is computed based on the output value of the accelerator position sensor 70. Alternatively, the engine load "KL" may be computed based on the output value of the airflow meter 14 or output values of the intake pressure sensor 18 and the crank angle sensor.

In the second embodiment, the retard control is not limited to the retarding process of the fuel injection timing of the port-fuel-injector 28. For example, in a case that the time period "T" is less than or equal to the specified time period "T1", the fuel injection for controlling the engine output may be performed by the direct-fuel-injector 52 instead of the port-fuel-injector 28 and the fuel injection timing of the dire-fuel-injector 52 may be retarded to a timing after a completion of the second coil-energization process in the intake stroke. In a case that the port-fuel-injector 28 injects the fuel for controlling the engine output, it takes a specified time period until the injected fuel is introduced into the combustion chamber 20 through the intake manifold 22. For this reason, a retard amount of the fuel injection timing in the intake stroke after the second coil-energization process is restricted. On the other hand, since the direct-fuel-injector 52 can inject the fuel for controlling the engine output into the combustion chamber 20 directly, a flexibility of the retard amount of the fuel injection timing can be improved, whereby it can be avoided that the auto-ignition occurs at inappropriate auto-ignition timing.

In the third embodiment, although the capacitor 84 is charged by the charging ignition device 88, it is not limited this structure. For example, instead of the charging ignition device 88, a booster circuit (converter) which boosts the voltage of the battery 76 can be provided to charge the capacitor 84.

The capacitor 84 can be replaced by a secondary battery as an electric storage.

Information about the ion-current is not limited to the input voltage Vin between the capacitor 84 and the resistor 86. For example, a current sensor is provided on a path through which the ion-current flows. An output of the current sensor can be used as the information about the ion-current.

In the above embodiments, the auto-ignition combustion control (steps S26 and S30) is executed based on the ion-output value during the main combustion period and the maximum value Vnvo of the ion-output value during the NVO period. Alternatively, the auto-ignition combustion control (step S30) may be executed based on only the ion-output value during the main combustion period. Even in this case, the accuracy of the auto-ignition combustion control can be improved.

What is claimed is:

1. A controller for an internal combustion engine, comprising:
    a first fuel supplying means for supplying a fuel into a combustion chamber of the internal combustion engine in an NVO period during which an exhaust valve and an intake valve are closed, the NVO period being established from a posterior time point of an exhaust stroke until an anterior time point of an intake stroke of the internal combustion engine;
    a second fuel supplying means for supplying a fuel into the combustion chamber in the intake stroke after a fuel supply by the first fuel supplying means;
    an ion-current obtaining means for obtaining an information about an ion-current which flows between a center electrode and a ground electrode of a spark plug in a period during which an electric voltage is applied between the center electrode and the ground electrode by an electric storage which stores a part of electric power supplied to the spark plug;
    a detector detecting a combustion condition of the supplied fuel based on the information about the ion-current obtained by the ion-current obtaining means;
    a first electric power supply means for supplying an electric power to the spark plug in order to charge the electric storage in a period from a posterior time point of the power stroke until the fuel is supplied by the first fuel supplying means; and
    a second electric power supply means for supplying an electric power to the spark plug again in order to charge the electric storage before the fuel is supplied by the second fuel supplying means when the electric power stored in the electric storage becomes lower than a specified value during the NVO period.

2. A controller for an internal combustion engine according to claim 1, wherein
    the second electric power supply means supplies the electric power to the spark plug again when an ion-current computed from an output value of the ion-current obtaining means is greater than or equal to a specified value during the NVO period.

3. A controller for an internal combustion engine according to claim 1, further comprising:
    a control means for performing an auto-ignition combustion control of the internal combustion engine based on the ion-current computed from an output value of the ion-current obtaining means during the NVO period.

4. A controller for an internal combustion engine according to claim 1, further comprising:
    a retard means for retarding a fuel supply timing of the second fuel supplying means when a time period from when the electric power charged by the electric storage becomes lower than a specified value during the NVO period until when the second fuel supplying means supplies the fuel becomes less than a specified time period.

5. A controller for an internal combustion engine according to claim 1, further comprising:
    a charging means for charging the electric storage without through the spark plug when a time period from when the electric power stored in the electric storage becomes lower than a specified value during the NVO period until when the second fuel supplying means supplies the fuel becomes less than a specified time period.

6. A controller for an internal combustion engine according to claim 1, wherein
    the first fuel supplying means includes a direct-fuel-injector which injects the fuel directly into the combustion chamber, and
    the second fuel supplying means includes a port-fuel-injector of which fuel injection rate is larger than that of the direct-fuel-injector.

* * * * *